United States Patent
Auyeung

(10) Patent No.: US 11,025,938 B2
(45) Date of Patent: Jun. 1, 2021

(54) COMPLEXITY REDUCTION OF SIGNIFICANCE MAP CODING

(71) Applicant: SONY CORPORATION, Tokyo (JP)

(72) Inventor: Cheung Auyeung, Sunnyvale, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/847,982

(22) Filed: Dec. 20, 2017

(65) Prior Publication Data

US 2018/0115781 A1   Apr. 26, 2018

Related U.S. Application Data

(63) Continuation of application No. 13/745,488, filed on Jan. 18, 2013.

(60) Provisional application No. 61/589,183, filed on Jan. 20, 2012.

(51) Int. Cl.
    *H04N 19/46*    (2014.01)
    *H04N 19/463*   (2014.01)
    *H04N 19/91*    (2014.01)

(52) U.S. Cl.
    CPC ........... *H04N 19/46* (2014.11); *H04N 19/463* (2014.11); *H04N 19/91* (2014.11)

(58) Field of Classification Search
    CPC ....... H04N 19/46; H04N 19/463; H04N 19/91
    See application file for complete search history.

(56) References Cited

U.S. PATENT DOCUMENTS

| | | | |
|---|---|---|---|
| 5,790,706 A | 8/1998 | Auyeung | |
| 2001/0046326 A1 | 11/2001 | Felts et al. | |
| 2007/0110153 A1 | 5/2007 | Cho et al. | |
| 2009/0175332 A1 | 7/2009 | Karczewicz et al. | |
| 2009/0201995 A1 | 8/2009 | Schwarz et al. | |
| 2010/0040136 A1 | 2/2010 | Sabo | |
| 2011/0001643 A1 | 1/2011 | Sze et al. | |
| 2011/0135210 A1 | 6/2011 | Liu et al. | |
| 2013/0016789 A1 | 1/2013 | Lou et al. | |
| 2013/0101046 A1 | 4/2013 | Korodi et al. | |
| 2013/0188683 A1 | 7/2013 | Kim et al. | |
| 2014/0348247 A1 | 11/2014 | Tsukuba et al. | |
| 2014/0362925 A1 | 12/2014 | Nguyen et al. | |

(Continued)

FOREIGN PATENT DOCUMENTS

| AU | 2016204082 A1 | 7/2016 |
|---|---|---|
| AU | 2018217277 A1 | 9/2018 |

(Continued)

OTHER PUBLICATIONS

Bross et al., WD5: Working Draft 5 of High-Efficiency Video Coding (JCTVC-G1103), 2011, Joint Collaborative Team on Video Coding (JCT-VC) of ITU-T SG16 WP3 and ISO/IEC JTC1/SC29/WG11 (Year: 2011).*

(Continued)

*Primary Examiner* — Francis Geroleo

(74) *Attorney, Agent, or Firm* — Chip Law Group

(57) ABSTRACT

The complexity of coding a significant_coeff_flag in video coding such as High Efficiency Video Coding (HEVC) is able to be reduced using the same mapping to select luma and chroma contexts for the coding of 4×4 significant maps. As a result, a 15 element lookup table and multiple branches are able to be removed to select the context index, and WD text is also simplified.

8 Claims, 5 Drawing Sheets grouping of 4x4 luma context grouping of 4x4 chroma context

(56) References Cited

U.S. PATENT DOCUMENTS

| | | |
|---|---|---|
| 2015/0010055 A1 | 1/2015 | Hsu et al. |
| 2017/0289574 A1 | 10/2017 | Nguyen et al. |
| 2018/0227597 A1 | 8/2018 | Nguyen et al. |
| 2019/0191183 A1 | 6/2019 | Nguyen et al. |

FOREIGN PATENT DOCUMENTS

| | | |
|---|---|---|
| CA | 2861953 A1 | 7/2013 |
| CN | 1742488 A | 3/2006 |
| CN | 1992896 A | 7/2007 |
| CN | 101233757 A | 7/2008 |
| CN | 101500159 A | 8/2009 |
| CN | 101631247 A | 1/2010 |
| CN | 101771868 A | 7/2010 |
| CN | 102118616 A | 7/2011 |
| CN | 103067701 A | 4/2013 |
| CN | 104041032 A | 9/2014 |
| CN | 104205646 A | 12/2014 |
| CN | 107302363 A | 10/2017 |
| CN | 107302364 A | 10/2017 |
| CN | 107302365 A | 10/2017 |
| CN | 107302366 A | 10/2017 |
| CN | 107302367 A | 10/2017 |
| CN | 107302368 A | 10/2017 |
| CN | 107302369 A | 10/2017 |
| CN | 107302702 A | 10/2017 |
| CN | 107302704 A | 10/2017 |
| CN | 107302705 A | 10/2017 |
| CN | 107493476 A | 12/2017 |
| DK | 2805419 T3 | 9/2017 |
| EP | 2428045 A1 | 3/2012 |
| EP | 2587802 A1 | 5/2013 |
| EP | 2618570 A | 7/2013 |
| EP | 2673954 A1 | 12/2013 |
| EP | 2805419 A1 | 11/2014 |
| EP | 2999123 A1 | 3/2016 |
| EP | 2999218 A1 | 3/2016 |
| ES | 2638093 T3 | 10/2017 |
| HU | E035958 T2 | 5/2018 |
| JP | 2015510319 A | 4/2015 |
| JP | 6133899 B2 | 5/2017 |
| JP | 2017175629 A | 9/2017 |
| JP | 6542831 B2 | 7/2019 |
| KR | 10-2010-0102701 A | 9/2010 |
| KR | 10-2014-0005329 A | 1/2014 |
| KR | 10-2014-0133526 A | 11/2014 |
| KR | 10-2015-0004930 A | 1/2015 |
| KR | 10-2017-0087525 A | 7/2017 |
| KR | 10-2017-0100048 A | 9/2017 |
| KR | 10-2017-0100049 A | 9/2017 |
| KR | 10-2017-0100050 A | 9/2017 |
| KR | 10-2019-0020196 A | 2/2019 |
| MX | 346550 B | 3/2017 |
| PT | 2805419 T | 9/2017 |
| RU | 2014134039 A1 | 3/2016 |
| RU | 2017145307 A1 | 2/2019 |
| WO | 2009/089370 A1 | 7/2009 |
| WO | 2010/128628 A1 | 11/2010 |
| WO | 2011/142817 A1 | 11/2011 |
| WO | 2012/096178 A1 | 7/2012 |
| WO | 2013/059652 A1 | 4/2013 |
| WO | 2013/065702 A1 | 5/2013 |
| WO | 2013/099892 A1 | 7/2013 |
| WO | 2013/104210 A | 7/2013 |
| WO | 2013/104210 A1 | 7/2013 |
| WO | 2013/107908 A | 7/2013 |
| WO | 2013/107908 A1 | 7/2013 |

OTHER PUBLICATIONS

Korodi, Encoding and decoding significant coefficient flags for small Transform Units using partition sets (JCTVC-G657), 2011, Joint Collaborative Team on Video Coding (JCT-VC) of ITU-T SG16 WP3 and ISO/IEC JTC1/SC29/WG11 (Year: 2011).*

Office Action for KR Patent Application No. 10-2016-7006585, dated Jan. 10, 2018, 05 pages of Office Action and 04 pages of English Translation.

Auyeung, et al., "Context Reduction of Significance Map Coding with CABAC", Joint Collaborative Team on Video Coding (JCT-VC) of ITU-T SG16 WP3 and ISO/IEC JTC1/SC29/WG11, Document: JCTVC-G366, 7th Meeting: Geneva, CH, Nov. 21-30, 2011, 11 pages.

Office Action for KR Patent Application No. 10-2016-7006584, dated Jan. 10, 2018, 05 pages of Office Action and 04 pages of English Translation.

Advisory Action for U.S. Appl. No. 13/745,488, dated Mar. 27, 2017, 02 pages.

Non-Final Office Action for U.S. Appl. No. 13/745,488, dated Jun. 27, 2017, 07 pages.

Final Office Action for U.S. Appl. No. 13/745,488, dated Jan. 20, 2017, 09 pages.

Non-Final Office Action for U.S. Appl. No. 13/745,488, dated Sep. 8, 2016, 09 pages.

Final Office Action for U.S. Appl. No. 13/745,488, dated Mar. 22, 2016, 11 pages.

Non-Final Office Action for U.S. Appl. No. 13/745,488, dated Aug. 4, 2015, 11 pages.

Office Action for JP Patent Application No. 2016-010588, dated Apr. 25, 2017, 04 pages of Office Action and 04 ages of English Translation.

Auyeung, et al., "Context Reduction of Significance Map Coding with CABAC", Joint Collaborative Team on Video Coding (JCT-VC) of ITU-T SGI6 WP3 and ISO/IEC JTC1/SC29/WG11, JCTVC-G366, 7th Meeting: Geneva, CH, Nov. 21-30, 2011, 12 pages.

Office Action for JP Patent Application No. 2014-553480, dated Aug. 5, 2016, 05 pages of Office Action and 11 pages of English Translation.

Bross, et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, JCTVC-H1003, 7th Meeting: Geneva, CH, Nov. 21-30, 2011, 259 pages.

European Extended Search Report Received for European Patent Application No. 13738520.9, dated Jun. 30, 2016, 10 pages.

Office Action for JP Patent Application No. 2014-553480, dated Apr. 26, 2016, 06 pages of Office Action and 03 paegs of English Translation.

Office Action for KR Patent Application No. 10-2014-7019231.

Advisory Action for U.S. Appl. No. 13/745,488, dated Jun. 8, 2016, 02 pages.

Piao, et al., "Reduced Contexts for Significance Map Coding of Large Transform in CABAC", Joint Collaborative Team on Video Coding (JCT-VC) of ITU-T SGI6 WP3 and ISO/IEC JTC1/SC29/WG11, JCTVC-G768, 7th Meeting: Geneva, CH, Nov. 21-30, 2011, 06 pages.

Bross, et al, "WD5: Working Draft 5 of High-Efficiency Video Coding", Joint Collaborative Team on Video Coding JCT-VC) of ITU-T SG16 WP3 and ISO/IEC JTC1/SC29/WG11, 7th Meeting: Geneva, CH, Nov. 21-30, 2011, 10 pages.

Piao, et al., "Reduced Chroma Contexts for Significance Map Coding in Cabac", JCTVC-G781, 7th Meeting: Geneva, CH, Nov. 21-30, 2011, pp. 1-4.

Marpe, et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

Bross, et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d0, 6th Meeting: Torino, IT, Jul. 14-22, 2011, 215 pages.

Cheung Auyeung, "Complexity Reduction of Significance Map Coding", Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, 11 pages.

Korodi, et al., "Encoding and Decoding Significant Coefficient Flags for Small Transform Unit Using Partition Set", JCTVC-G657, 7th Meeting; Geneva, CH, Nov. 21-30, 2011.

(56) References Cited

OTHER PUBLICATIONS

Auyeung, et al., "A Combined Proposal From JCTVC-G366, JCTVC-G657, and JCTVC-G768 on Context Reduction of Significance Map Coding With CABAC", JCTVC-G1015, 7th Meeting: Geneva, CH, Nov. 21-30, 2011.
Sze, et al., "Description of Core Experiment (CE11 ); Coefficient Scanning and Coding", JCTVC-F911, 6th Meeting: Torino, IT, Jul. 14-22, 2011.
Sole, et al., "CE11: Unified Scans for the Significance Map and Coefficient Level Coding in High Efficiency," JCTVC-F288, 6th Meeting: Torino, IT, Jul. 14-22, 2011.
Vivienne Sze, "Reduction in Contexts Used for Significant_Coeff_Flag and Coefficient Level", JCTVC-F132,6th Meeting: Torino, IT, Jul. 14-22, 2011.
Vivienne Sze, "Reduction in Contexts Used for Ceofficient Level", JCTVC-G121, 7th Meeting: Geneva, CH, Nov. 21-30, 2011.
Sole, et al., "Parallel Context Processing for Significance Map in High Coding Efficiency", Joint Collaborative Team Video Coding (JCT-VC) of ITU-T SG16 WP3 and ISO/IEC JTC1/SC29/WG11, Document: KCTVC-0262, WG11 D No. m19026, 4th Meeting: Daegu, KR, Jan. 2011, 04 pages.
Office Action received in Chinese Patent Application No. 201380000180.7, dated May 20, 2016, 15 pages of office Action including 9 pages of English Translation.
Office Action for JP Patent Application No. 2017-123995, dated Mar. 13, 2018, 05 pages of Office Action and 05 pages of English Translation.
Office Action for JP Patent Application No. 2017-123996, dated Mar. 13, 2018, 05 pages of Office Action and 05 pages of English Translation.
Office Action for KR Patent Application No. 10-2018-7007000, dated Apr. 5, 2018, 05 pages of Office Action and 04 pages of English Translation.
Office Action for KR Patent Application No. 10-2018-7006998, dated Apr. 5, 2018, 05 pages of Office Action and 04 pages of English Translation.
Auyeung, et al., "Context Reduction of Significance Map Coding with CABAC", Joint Collaborative Team on Video Coding (JCT-VC) of ITU-T SG16 WP3 and ISO/IEC JTC1/SC29/WG11, JCTVC-G366, 7th Meeting, Nov. 21-30, 2011, pp. 1-12.
Bross, et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th Meeting, JCTVC-G1103_d6, Nov. 21-30, 2011, 225 pages.
Piao, et al., "Reduced Chroma Contexts for Significance Map Coding in CABAC", Joint Collaborative Team on Video Coding (JCT-VC) of ITU-T SG16 WP3 and ISO/IEC JTC1/SC29/WG11, JCTVC-G781,7th Meeting, Nov. 21-30, 2011, pp. 1-4.
Piao, et al., "Reduced Contexts for Significance Map Coding of Large Transform in CABAC", Joint Collaborative Team on Video Coding (JCT-VC) of ITU-T SG16 WP3 and ISO/IEC JTC1/SC29/WG11, JCTVC-G768, 7th Meeting, Nov. 21-30, 2011, pp. 1-6.
Cheung Auyeung, "Complexity Reduction of Significance Map Coding", Joint Collaborative Team on Video Coding (JCT-VC) of ITU-T SG16 WP3 and ISO/IEC JTC1/SC29/WG11, JCTVC-H0383, 8th Meeting, Feb. 1-10, 2012, pp. 1-13.
Korodi, et al., "Encoding and Decoding Significant Coefficient Flags for Small Transform Units using Partition Sets", Joint Collaborative Team on Video Coding (JCT-VC) of ITU-T SG16 WP3 and ISO/IEC JTC1/SC29/WG11, 7th Meeting, JCTVC-G657, Nov. 21-30, 2011, pp. 1-18.
Office Action for CN Patent Application No. 201610245567.4, dated Apr. 25, 2018, 06 pages of Office Action and 12 pages of English Translation.
Non-Final Office Action in U.S. Appl. No. 15/847,995 dated Oct. 1, 2018.
Korodi, Encoding and decoding significant coefficient flags for small Transform Units using partition sets (JCTVC-G657), 2011, Joint Collaborative Team on Video Calling (JCT-VC) of ITU-T SG16 WP3 and ISO/IEC JTC1/SC29/WG11 (Year: 2011).

Korodi, et al., "Encoding and Decoding Significant Coefficient Flags for Small Transform Units Using Partition Sets", Joint Collaborative Team on Video Coding (JCT-VC) of ITU-T SG16 WP3 and ISO/IEC JTC1/SC29/WG11, Document: JCTVC-G657, 7th Meeting, Nov. 21-30, 2011, 18 pages.
Office Action for JP Patent Application No. 2017-123996, dated Sep. 11, 2018, 02 pages of Office Action and 1 pages of translation.
Office Action for JP Patent Application No. 2017-123995, dated Sep. 11, 2018, 02 pages of Office Action and 1 pages of translation.
Office Action for EP Patent Application No. 13738520.9, dated Feb. 1, 2019, 08 pages of Office Action.
Bross, et al., "WD:5 Working Draft 5 of High-Efficiency Video Coding", Joint Collaborative Team on Video Coding (JCT-VC) of ITU-T SG16 WP3 and ISO/IEC JTC1/SC29/WG11, 7th Meeting, JCTVC-G1103_d5, Nov. 21-30, 2011, 213 pages.
Korodi, et al., "Encoding and Decoding Significant Coefficient Flags for Small Transform Units Using Partition Sets", Joint Collaborative Team on Video Coding (JCT-VC) of ITU-T SG16 WP3 and ISO/IEC JTC1/SC29/WG11, 7 Meeting, JCTVC-G657, Nov. 21-30, 2011, 14 pages.
Final Office Action for U.S. Appl. No. 15/847,995, dated Jan. 24, 2019.
Non-Final Office Action issued in U.S. Appl. No. 15/847,995 dated Jun. 6, 2019.
Office Action for EP Patent Application No. 13738520.9, dated Feb. 1, 2019, 07 pages of Office Action.
Final Office Action issued in U.S. Appl. No. 15/847,995 dated Sep. 23, 2019.
Extended European Search Report of EP Application No. 19176588.2, dated Sep. 10, 2019, 09 pages.
Bross, et al., "WD5: Working Draft 5 of High-Efficiency Video Coding", Joint Collaborative Team on Video Coding (JCT-VC) of ITU-T SG16 WP3 and ISO/IEC JTC1/SC29/WG11, 7th meeting, Geneva, CH, Nov. 21-30, 2011, 213 pages.
Cheung Auyeung, "Complexity reduction of significance map coding", Sony Electronics Inc., Joint Collaborative Team on Video Coding (JCT-VC) of ITU-T SG16 WP3 and ISO/IEC JTC1/SC29/WG11, 8th meeting, San Jose, CA, USA, Feb. 1-10, 2012, 11 pages.
Korodi, et al., "Encoding and decoding significant coefficient flags for small Transform Units using partition sets", Joint Collaborative Team on Video Coding (JCT-VC) of ITU-T SG16 WP3 and ISO/IEC JTC1/SC29/WG11, 7th meeting, Geneva, Nov. 21-30, 2011, 14 pages.
Office Action for CN Patent Application No. 201710234398.9, dated Jan. 3, 2020, 06 pages pf Office Action and 09 pages of English Translation.
Office Action for KR Patent Application No. 10-2016-7006585, dated Feb. 11, 2020, 05 pages of Office Action and 04 pages of English Translation.
Office Action for KR Patent Application No. 10-2016-7006584, dated Feb. 11, 2020, 05 pages of Office Action and 04 pages of English Translation.
Bross, et al., "WD5: Working Draft 5 of High-Efficiency Video Coding", Joint Collaborative Team on Video Coding (JCT-VC) of ITU-T SG16 WP3 and ISO/IEC JTC1/SC29/WG11, JCTVC-G1103_d6, 7th meeting, Geneva, Nov. 21-30, 2011, 225 pages.
Auyeung, et al., "Context reduction of significance map coding with CABAC", Joint Collaborative Team on Video Coding (JCT-VC) of ITU-T SG16 WP3 and ISO/IEC JTC1/SC29/WG11, JCTVC-G366, 7th meeting, Geneva, Nov. 21-30, 2011, 11 pages.
Korodi, et al., "Encoding and Decoding Significant Coefficient Flags for Small Transform Units using Partition Sets", Joint Collaborative Team on Video Coding (JCT-VC) of ITU-T SG16 WP3 and ISO/IEC JTC1/SC29/WG11, JCTVC-G657, 7th meeting, Geneva, Nov. 21-30, 2011, 14 pages.
Non-Final Office Action for U.S. Appl. No. 15/847,995 dated Jan. 9, 2020.
Final Office Action for U.S. Appl. No. 15/847,995 dated Apr. 17, 2020.
Non-Final Office Action for U.S. Appl. No. 15/847,995 dated Aug. 12, 2020.
Korodi, et al., "Encoding and Decoding Significant Coefficient flags for small Transform Units using partition sets", Joint Collaborative

(56) References Cited

OTHER PUBLICATIONS

Team on Video Coding (JCT-VC) of ITU-T SG16 WP3 and ISO/IEC JTC1/SC29/WG11, JCTVC-3657, 7th Meeting, Geneva, CH, Nov. 21-30, 2011, 18 pages.

Office Action for KR Patent Application No. 10-2016-7006584, dated Jan. 5, 2021, 4 pages of English Translation and 5 pages of Office Action.

Office Action for CN Patent Application No. 201910751266.2 dated Mar. 30, 2021, 1 page of Office Action and 02 pages of English translation.

* cited by examiner

COMPLEXITY REDUCTION OF SIGNIFICANCE MAP CODING

CROSS-REFERENCE TO RELATED APPLICATION

The present application is a continuation application of U.S. patent application Ser. No. 13/745,488, filed Jan. 18, 2013, and claims priority under 35 U.S.C. § 119(e) of the U.S. Provisional Patent Application Ser. No. 61/589,183, filed Jan. 20, 2012 and titled, "COMPLEXITY REDUCTION OF SIGNIFICANCE MAP CODING," which is hereby incorporated by reference in its entirety for all purposes.

FIELD OF THE INVENTION

The present invention relates to the field of video coding. More specifically, the present invention relates the complexity reduction in video coding.

BACKGROUND OF THE INVENTION

For encoding the significant_coeff_flag, the following has been utilized: a 4×4 positional-based coding method which has 9 context for luma and 6 contexts for chroma; a 8×8 positional-based coding method which has 11 contexts for luma and 11 contexts for chroma; and a 16×16/32×32 mask-based coding method which has 7 contexts for luma and 4 contexts for chroma.

As shown in FIG. 1, the 4×4 positional-based coding method has different groupings of a significance map for luma 102 and chroma 100. Therefore, different mappings for chroma 102 and luma 100 are used to map the position in the significance map to the corresponding context index increment. As a result, the following complexities exist: two 15 element mapping tables are used to determine the context increment, and branches based on the luma/chroma decisions are needed to determine the context increment in the coding of 4×4, 8×8 and 16×16/32×32 significance maps.

SUMMARY OF THE INVENTION

The complexity of coding a significant_coeff_flag in video coding such as High Efficiency Video Coding (HEVC) is able to be reduced using the same mapping to select 4×4 luma and chroma contexts. As a result, a 15 element lookup table and multiple branches are able to be removed to select the context index of significant_coeff_flag, and WD text is also simplified.

In one aspect, a method of reducing complexity in coding of non-zero 4×4 significance map programmed in a device comprises scanning quantized transform coefficients, determining a position of a last non-zero quantized coefficient, and generating a significance map from the quantized transform coefficients, wherein a significance of a quantized transform coefficient before the last non-zero quantized coefficient has a same number of contexts and a same mapping for luma and chroma to determine context index increment. The context increment mapping comprises a single 15 element lookup table. The method further comprises coding video content without determining a context offset based on a luma/chroma decision of at least one of 8×8, 16×16, and 32×32 significance map. The device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, a portable music player, a tablet computer, a video player, a DVD writer/player, a high definition video writer/player, a television and a home entertainment system.

In another aspect, an encoder comprises a scanning module programmed in hardware configured for scanning quantized transform coefficients, a first generating module programmed in hardware configured for generating a position of a last non-zero quantized transform coefficient, and a second generating module programmed in hardware configured for generating a significance map from the quantized transform coefficients, wherein a significance of a quantized transform coefficient before the last non-zero quantized coefficient has a same number of contexts and a same mapping for luma and chroma to determine context index increment. The context increment mapping comprises a single 15 element lookup table. The encoder further comprises a coding module programmed in hardware for coding video content without determining a context offset based on a luma/chroma decision of at least one of 8×8, 16×16, and 32×32 significance map. The encoder is contained within a device selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, a portable music player, a tablet computer, a video player, a DVD writer/player, a high definition video writer/player, a television and a home entertainment system.

In another aspect, an apparatus comprises a non-transitory memory for storing an application, the application for generating a significance map from quantized transform coefficients, wherein a significance of a quantized transform coefficient before the last non-zero quantized coefficient has a same number of contexts and a same mapping for luma and chroma to determine context index increment and a processing component coupled to the memory, the processing component configured for processing the application. The application is further for scanning the quantized transform coefficients. The context increment mapping comprises a single 15 element lookup table. The application is further for coding video content without determining a context offset based on a luma/chroma decision of at least one of 8×8, 16×16, and 32×32 significance map.

DETAILED DESCRIPTION OF THE PREFERRED EMBODIMENT

Figure 1:
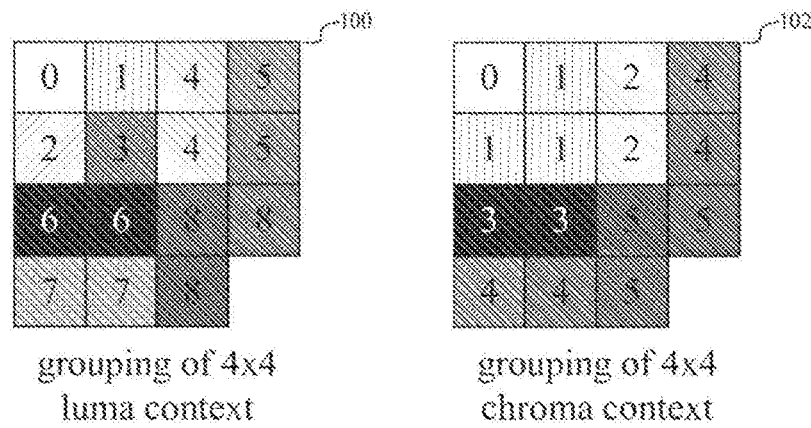
FIG. 1 illustrates a diagram of a significance map with different groupings for the luma and chroma contexts according to some embodiments.

Video compression is utilized to transmit and receive digital video information more efficiently. Video compression utilizes techniques to reduce or remove redundant data in video sequences. In High Efficiency Video Coding (HEVC), a video frame is partitioned into coding units (CUs). CUs are able to be split into smaller blocks for prediction or transform. Each CU is able to be further partitioned into prediction units (PUs) and transform units (TUs).

A CU typically has a luminance component, denoted as Y, and two chroma components, denoted as U and V.

To code a data block, a predictive block for the block is derived. The predictive block, is able to be derived either through intra (I) prediction (e.g., spatial prediction) or inter (P or B) prediction (e.g., temporal prediction). Upon identification of a predictive block, the difference between the original video data block and its predictive block is determined. This difference is referred to as the prediction residual data, and indicates the pixel differences between the pixel values in the block to the coded and the pixel values in the predictive block selected to represent the coded block. To achieve better compression, the prediction residual data is able to be transformed (e.g., using a discrete cosine transform (DCT) or another transform).

The residual data in a transform block is able to be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients are able to be quantized prior to entropy coding. An entropy coder applies entropy coding, such as Context Adaptive Variable Length Coding (CAVLC), Context Adaptive Binary Arithmetic Coding (CABAC), Probability Interval Partitioning Entropy Coding (PIPE), or another entropy coding, to the quantized transform coefficients.

To entropy code a block of quantized transform coefficients, a scanning process is usually performed so that the two-dimensional (2-D) array of quantized transform coefficients in a block is processed, according to a particular scan order, in an ordered, one-dimensional (1-D) array (e.g., vector) of transform coefficients. Entropy coding is applied in the 1-D order of transform coefficients. The scan of the quantized transform coefficients in a transform unit serializes the 2-D array of transform coefficients for the entropy coder. A significance map is able to be generated to indicate the positions of significant (e.g., non-zero) coefficients. Scanning is able to be applied to code levels of significant (e.g., nonzero) coefficients, and/or to code signs of the significant coefficients.

In the HEVC Standard, 4×4 non-zero coefficient locations are encoded by means of a 4×4 significance map. The 4×4 significance map in the HEVC Standard is encoded as follows. The coordinate of the last significant coefficient is transmitted. Then for each coefficient before the last significant coefficient in scanning order, a one-bit symbol significant_coeff_flag is transmitted.

The complexity of coding a significant_coeff_flag in video coding such as High Efficiency Video Coding (HEVC) is able to be reduced using the same mapping to select luma and chroma contexts. As a result, a 15 element lookup table and multiple branches are able to be removed to select the context index, and WD text is also simplified. A reduction of decoder runtime of 0-3% has been observed in HM5.0. The BD-rate for AI_HE, RA_HE, LB_HE are 0.00%, −0.01%, 0.01%, respectively. The BD-rate for AI_LC, RA_LC, LB_LC are 0.00%, 0.01%, −0.01%, respectively. The BD-rate for RA_HE10 is 0.03%.

Figure 2:
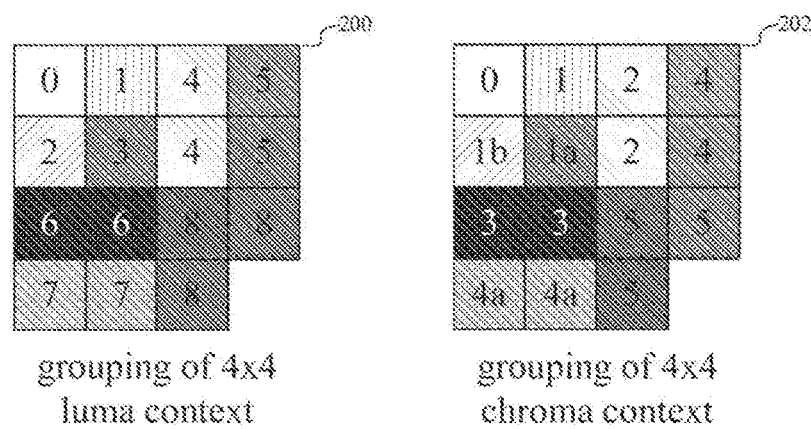
FIG. 2 illustrates a diagram of a significance map with where the luma and chroma contexts have the same number of contexts and the same context index increment mapping according to some embodiments.

As shown by the grouping colors in FIG. 2, the same grouping of the 4×4 luma 200 contexts are able to be reused for the grouping of the 4×4 chroma contexts 202. As a result, complexity is reduced in the following aspects: the chroma 15 elements mapping table previously used is removed Branches based on the luma/chroma decision to determine the initial context offset in at least one of 8×8/16×16/32×32 significance map are also removed.

The context reductions were integrated into HM5.0. The simulations were performed in three Microsoft HPC clusters, the common test conditions and reference configurations are followed:

All intra simulations are performed on AMD Opteron Processor 6136 cluster @ 2.4 GHz.

All RA simulations are performed on Intel Xeon X5690 cluster @ 3.47 GHz.

All LD simulations are performed on Intel Xeon X5680 cluster @ 3.33 GHz. Table 1 shows the BD-rate and timing of the complexity reduction for the coding of significance map.

TABLE 1

BD-rate of complexity reductions.

| | All Intra HE | | | All Intra LC | | | All Intra HE-10 | | |
|---|---|---|---|---|---|---|---|---|---|
| | Y | U | V | Y | U | V | Y | U | V |
| Class A (8 bit) | 0.00% | −0.02% | −0.02% | 0.00% | 0.01% | −0.01% | | | |
| Class B | 0.00% | −0.03% | 0.01% | 0.00% | 0.00% | 0.03% | | | |
| Class C | 0.01% | −0.06% | −0.02% | 0.00% | −0.01% | 0.00% | | | |
| Class D | 0.00% | 0.01% | −0.04% | 0.00% | 0.02% | −0.02% | | | |
| Class E | 0.00% | 0.00% | 0.00% | 0.00% | 0.02% | −0.02% | | | |
| Overall | 0.00% | −0.02% | −0.01% | 0.00% | 0.01% | 0.00% | | | |
| | 0.00% | −0.02% | −0.01% | 0.00% | 0.01% | 0.00% | | | |
| Class F | #VALUE! | #VALUE! | #VALUE! | #VALUE! | #VALUE! | #VALUE! | | | |
| Enc Time[%] | | 100% | | | 100% | | | | |
| Dec Time[%] | | 99% | | | 100% | | | | |

TABLE 1-continued

BD-rate of complexity reductions.

| | Random Access HE | | | Random Access LC | | | Random Access HE-10 | | |
|---|---|---|---|---|---|---|---|---|---|
| | Y | U | V | Y | U | V | Y | U | V |
| Class A (8 bit) | −0.03% | −0.11% | −0.21% | 0.00% | 0.07% | −0.17% | 0.03% | 0.15% | 0.13% |
| Class B | 0.00% | −0.06% | −0.01% | 0.02% | 0.15% | 0.20% | 0.03% | −0.05% | −0.09% |
| Class C | −0.04% | −0.06% | 0.07% | 0.02% | −0.03% | −0.06% | | | |
| Class D | 0.03% | −0.19% | 0.08% | −0.01% | 0.31% | −0.24% | | | |
| Class E | | | | | | | | | |
| Overall | −0.01% | −0.10% | 0.01% | 0.01% | 0.14% | −0.03% | 0.03% | 0.04% | 0.00% |
| | −0.01% | −0.13% | 0.01% | 0.01% | 0.11% | −0.07% | 0.04% | 0.07% | 0.05% |
| Class F | #VALUE! | #VALUE! | #VALUE! | #VALUE! | #VALUE! | #VALUE! | | | |
| Enc Time[%] | | 100% | | | 100% | | | 100% | |
| Dec Time[%] | | 99% | | | 99% | | | 100% | |

| | Low delay B HE | | | Low delay B LC | | | Low delay B HE-10 | | |
|---|---|---|---|---|---|---|---|---|---|
| | Y | U | V | Y | U | V | Y | U | V |
| Class A | | | | | | | | | |
| Class B | 0.01% | 0.02% | 0.10% | −0.04% | −0.12% | 0.17% | | | |
| Class C | 0.01% | −0.01% | 0.09% | 0.03% | 0.08% | 0.06% | | | |
| Class D | −0.02% | −0.05% | 0.10% | −0.02% | 0.63% | −0.09% | | | |
| Class E | 0.07% | −0.37% | −0.43% | 0.03% | 0.09% | −0.10% | | | |
| Overall | 0.01% | −0.08% | 0.00% | −0.01% | 0.16% | 0.03% | | | |
| | 0.01% | −0.05% | −0.03% | −0.01% | 0.19% | 0.05% | | | |
| Class F | #VALUE! | #VALUE! | #VALUE! | #VALUE! | #VALUE! | #VALUE! | | | |
| Enc Time[%] | | 100% | | | 100% | | | | |
| Dec Time[%] | | 97% | | | 99% | | | | |

As shown in Table 3, the method described herein reduced the decoder execution time from 0% to 3% and resulted in average luminance BD-rate of −0.01% to 0.03%.

TABLE 2

Average decoder time of significance map coding complexity reduction.

| | HE | LC | HE-10 |
|---|---|---|---|
| I | 99% | 100% | |
| RA | 99% | 99% | 100% |
| LB | 97% | 99% | |

TABLE 3

Average BDR of significance map coding complexity reduction.

| | HE | LC | HE-10 |
|---|---|---|---|
| I | 0.00% | 0.00% | |
| RA | −0.01% | 0.01% | 0.03% |
| LB | 0.01% | −0.01% | |

The following is the derivation process of ctxIdxInc for the syntax element significant_coeff_flag modified with respect to HM5.0:

Inputs to this process are the color component index cIdx, the current coefficient scan position (xC, yC), the transform block width log 2TrafoWidth and the transform block height log 2TrafoHeight.

Output of this process is ctxIdxInc.

The variable sigCtx depends on the current position (xC, yC), the color component index cIdx, the transform block size and previously decoded bins of the syntax element significant_coeff_flag. For the derivation of sigCtx, the following applies.

If log 2TrafoWidth is equal to log 2TrafoHeight and log 2TrafoWidth is equal to 2, sigCtx is derived using ctxIdxMap4×4[ ] specified in Table 4 as follows.

sigCtx=ctxIdxMap4×4 [(yC<<2)+xC]

Otherwise if log 2TrafoWidth is equal to log 2TrafoHeight and log 2TrafoWidth is equal to 3, sigCtx is derived using ctxIdxMap8×8[ ] specified in Table 5 as follows.

sigCtx=((xC+yC)==0)?10: ctxIdxMap8×8[((yC>>1)<<2)+(xC>>1)]

sigCtx+=9

Otherwise if xC+yC is equal to 0, sigCtx is derived as follows.

sigCtx=20

Otherwise (xC+yC is greater than 0), sigCtx is derived using previously decoded bins of the syntax element significant_coeff_flag as follows.

The variable sigCtx is initialized as follows.

sigCtx=0

When xC is less than (1<<log 2TrafoWidth)−1, the following applies.

sigCtx=sigCtx+significant_coeff_flag[xC+1][yC]

When xC is less than (1<<log 2TrafoWidth)−1 and yC is less than (1<<log 2TrafoHeight)−1, the following applies.

sigCtx=sigCtx+significant_coeff_flag[xC+1][yC+1]

When xC is less than (1<<log 2Width)−2, the following applies.

sigCtx=sigCtx+significant_coeff_flag[xC+2][yC]

When all of the following conditions are true, yC is less than (1<<log 2TrafoHeight)−1, xC % 4 is not equal to 0 or yC % 4 is not equal to 0, xC % 4 is not equal to 3 or yC % 4 is not equal to 2, the following applies.

sigCtx=sigCtx+significant_coeff_flag[xC][yC+1]

When yC is less than (1<<log 2TrafoHeight)−2 and sigCtx is less than 4, the following applies.

sigCtx=sigCtx+significant_coeff_flag[xC][yC+2]

The variable sigCtx is modified as follows.

If cIdx is equal to 0 and xC+yC are greater than (1<<(max(log 2TrafoWidth, log 2TrafoHeight)−2))−1, the following applies.
  sigCtx=((sigCtx+1)>>1)+24
Otherwise, the following applies.
  sigCtx=((sigCtx+1)>>1)+21
The context index increment ctxIdxInc is derived using the color component index cIdx and sigCtx as follows.
If cIdx is equal to 0, ctxIdxInc is derived as follows.
  ctxIdxInc=sigCtx
Otherwise (cIdx is greater than 0), ctxIdxInc is derived as follows.
  ctxIdxInc=27+sigCtx

TABLE 4

Specification of ctxIdxMap4 × 4[i]

| i | 0 | 1 | 2 | 3 | 4 | 5 | 6 | 7 | 8 | 9 | 10 | 11 | 12 | 13 | 14 |
|---|---|---|---|---|---|---|---|---|---|---|----|----|----|----|----|
| ctxIdxMap4 × 4[i] | 0 | 1 | 4 | 5 | 2 | 3 | 4 | 5 | 6 | 6 | 8 | 8 | 7 | 7 | 8 |

TABLE 5

Specification of ctxIdxMap8 × 8[i]

| i | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| ctxIdxMap8 × 8[i] | 0 | 1 | 2 | 3 | 4 | 5 | 6 | 3 | 8 | 6 | 6 | 7 | 9 | 9 | 7 | 7 |

The context derivation assumes maximum transform sizes less than or equal to 32×32 for luma and 16×16 for chroma and minimum transform sizes greater than or equal to 4×4.

TABLE 6

Values of variable initValue for significant_coeff_flag ctxIdx

| Initialisation variable | significant coeff flag ctxIdx | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| initValue | 74 | 73 | 88 | 72 | 72 | 55 | 71 | 54 | 71 | 88 | 103 | 71 | 53 | 87 | 134 | 86 | 84 |
| | 17 | 18 | 19 | 20 | 21 | 22 | 23 | 24 | 25 | 26 | 27 | 28 | 29 | 30 | 31 | 32 | 33 |
| initValue | 70 | 68 | 89 | 90 | 84 | 88 | 74 | 130 | 118 | 88 | 120 | 87 | 87 | 87 | 149 | 52 | 70 |
| | 34 | 35 | 36 | 37 | 38 | 39 | 40 | 41 | 42 | 43 | 44 | 45 | 46 | 47 | 48 | 49 | 50 |
| iinitValue | 52 | 118 | 133 | 116 | 114 | 129 | 132 | 162 | 115 | 51 | 115 | 66 | 120 | 74 | 115 | 87 | 89 |
| | 51 | 52 | 53 | 54 | 55 | 56 | 57 | 58 | 59 | 60 | 61 | 62 | 63 | 64 | 65 | 66 | 67 |
| initValue | 152 | 119 | 103 | 118 | 87 | 70 | 70 | 53 | 118 | 134 | 118 | 101 | 68 | 85 | 101 | 116 | 100 |
| | 68 | 69 | 70 | 71 | 72 | 73 | 74 | 75 | 76 | 77 | 78 | 79 | 80 | 81 | 82 | 83 | 84 |
| initValue | 65 | 67 | 136 | 168 | 147 | 150 | 120 | 115 | 118 | 119 | 136 | 102 | 102 | 102 | 70 | 67 | 53 |
| | 85 | 86 | 87 | 88 | 89 | 90 | 91 | 92 | 93 | 94 | 95 | 96 | 97 | 98 | 99 | 100 | 101 |
| initValue | 67 | 117 | 102 | 117 | 1158 | 114 | 84 | 115 | 99 | 100 | 83 | 114 | 152 | 168 | 131 | 150 | 120 |
| | 102 | 103 | 104 | 105 | 106 | 107 | 108 | 109 | 110 | 111 | 112 | 113 | 114 | 115 | 116 | 117 | 118 |
| initValue | 152 | 119 | 103 | 118 | 87 | 70 | 70 | 53 | 71 | 103 | 118 | 101 | 68 | 85 | 101 | 116 | 116 |
| | 119 | 120 | 121 | 122 | 123 | 124 | 125 | 126 | 127 | 128 | 129 | 130 | 131 | 132 | 133 | 134 | 135 |
| initValue | 68 | 67 | 152 | 168 | 147 | 150 | 120 | 115 | 118 | 119 | 136 | 102 | 102 | 102 | 86 | 67 | 84 |
| | 136 | 137 | 138 | 139 | 140 | 141 | 142 | 143 | 144 | 145 | 146 | 147 | 148 | 149 | 150 | 151 | 152 |
| initValue | 67 | 117 | 102 | 117 | 115 | 99 | 100 | 115 | 99 | 100 | 83 | 114 | 152 | 152 | 131 | 150 | 120 |

Figure 3:
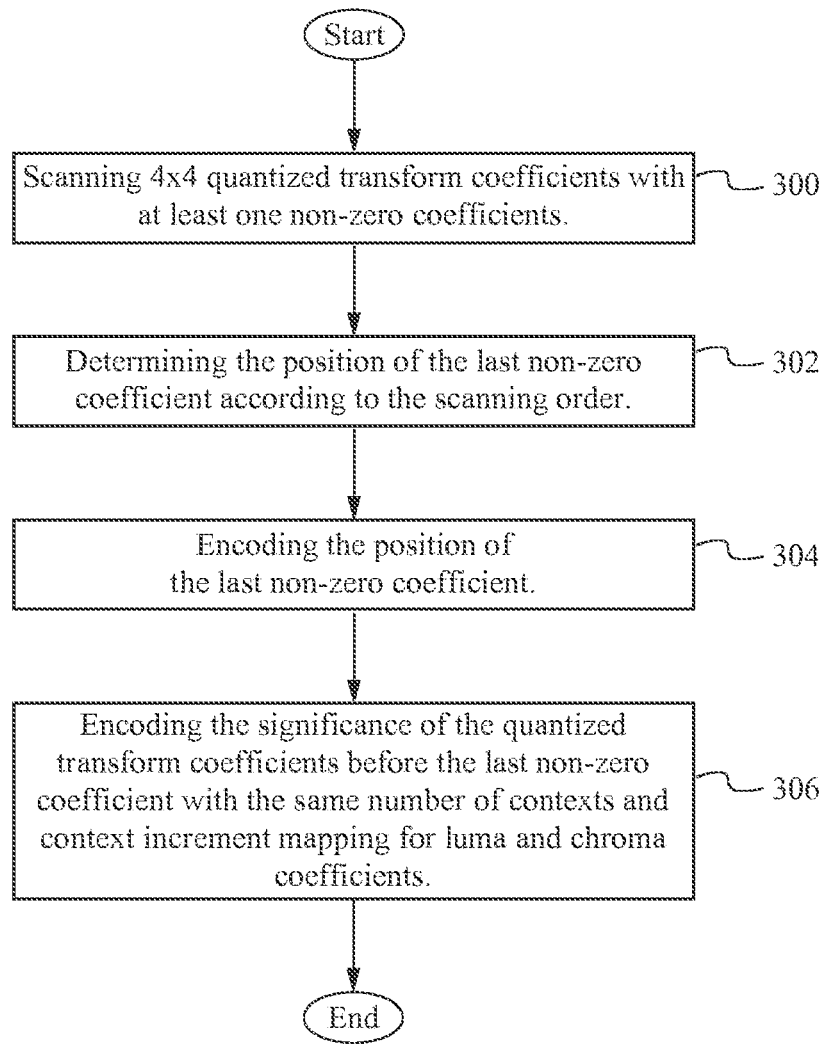
FIG. 3 illustrates a flowchart of a method of complexity reduction of significance map coding according to some embodiments.

FIG. 3 illustrates a flowchart of a method of complexity reduction of 4×4 significance map coding according to some embodiments. In the step 300, quantized transform coefficients with at least one non-zero quantized transform coefficient are scanned. In step 302, the position of the last non-zero quantized coefficients in a scan order is determined. In step 304, the position of the last coefficients is encoded. In step 306, the significance of the quantized transform coefficients before the last non-zero coefficient is encoded with the same number of contexts and context increment mapping for luma and chroma coefficients. In some embodiments, more or fewer steps are implemented. In some embodiments, the order of the steps is modified.

Figure 4:
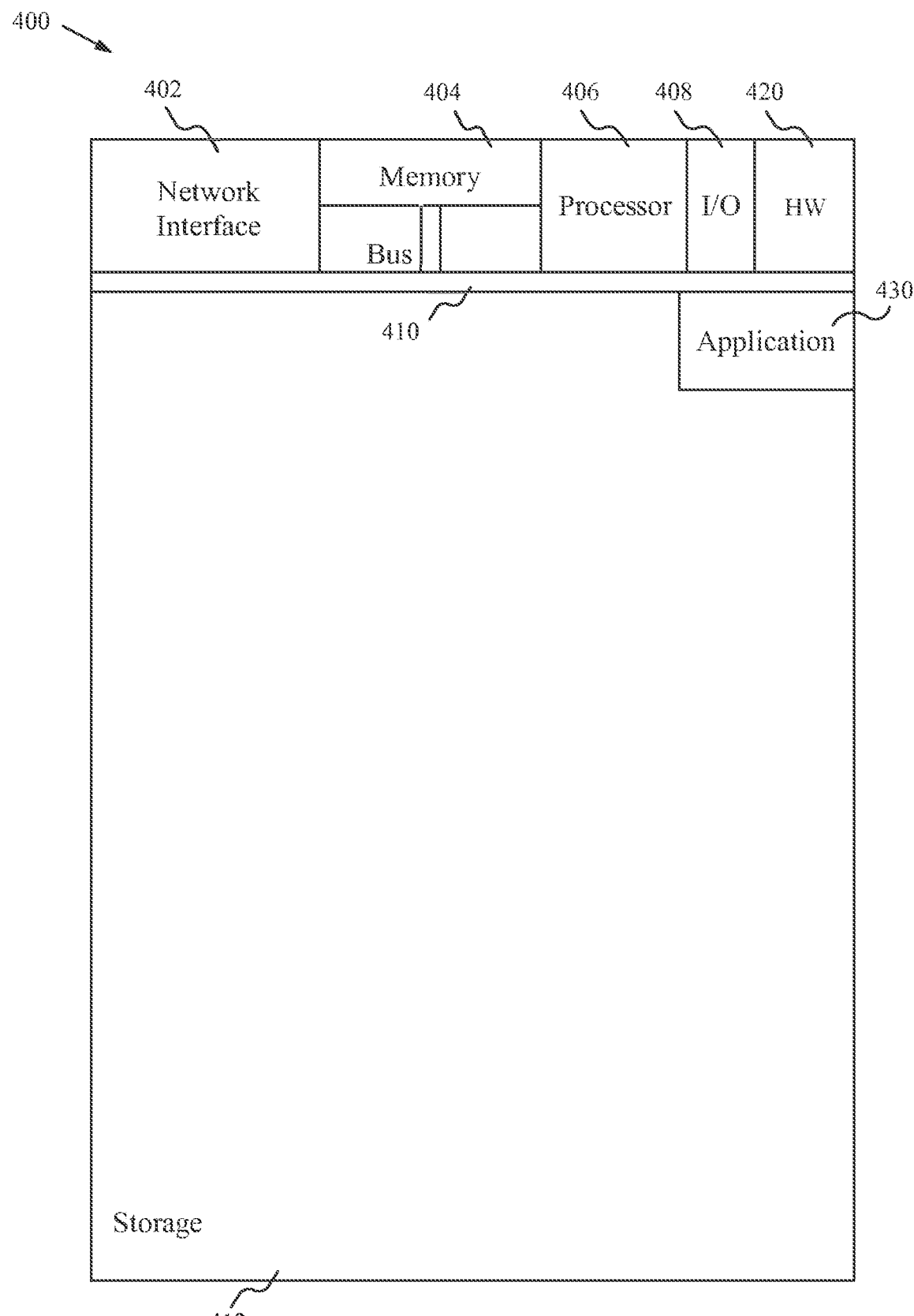
FIG. 4 illustrates a block diagram of an exemplary computing device configured to implement the reduced complexity significance map coding method according to some embodiments.

FIG. 4 illustrates a block diagram of an exemplary computing device configured to implement the reduced complexity significance map coding method according to some embodiments. The computing device 400 is able to be used to acquire, store, compute, process, communicate and/or display information such as images and videos. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, Blu-Ray®, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, screen, printer, modem, touchscreen, button interface and other devices. Reduced complexity significance map coding application(s) 430 used to perform the reduced complexity significance map coding method are likely to be stored in the storage device 412 and memory 404 and processed as applications are typically processed. More or less components shown in FIG. 4 are able to be included in the computing device 400. In some embodiments, reduced complexity significance map coding hardware 420 is included.

Although the computing device 400 in FIG. 4 includes applications 430 and hardware 420 for the reduced complexity significance map coding method, the reduced complexity significance map coding method is able to be implemented on a computing device in hardware, firmware, software or any combination thereof. For example, in some embodiments, the reduced complexity significance map coding applications 430 are programmed in a memory and executed using a processor. In another example, in some embodiments, the reduced complexity significance map coding hardware 420 is programmed hardware logic including gates specifically designed to implement the reduced complexity significance map coding method.

In some embodiments, the reduced complexity significance map coding application(s) 430 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-Ray® writer/player), a television, a home entertainment system or any other suitable computing device.

Figure 5:
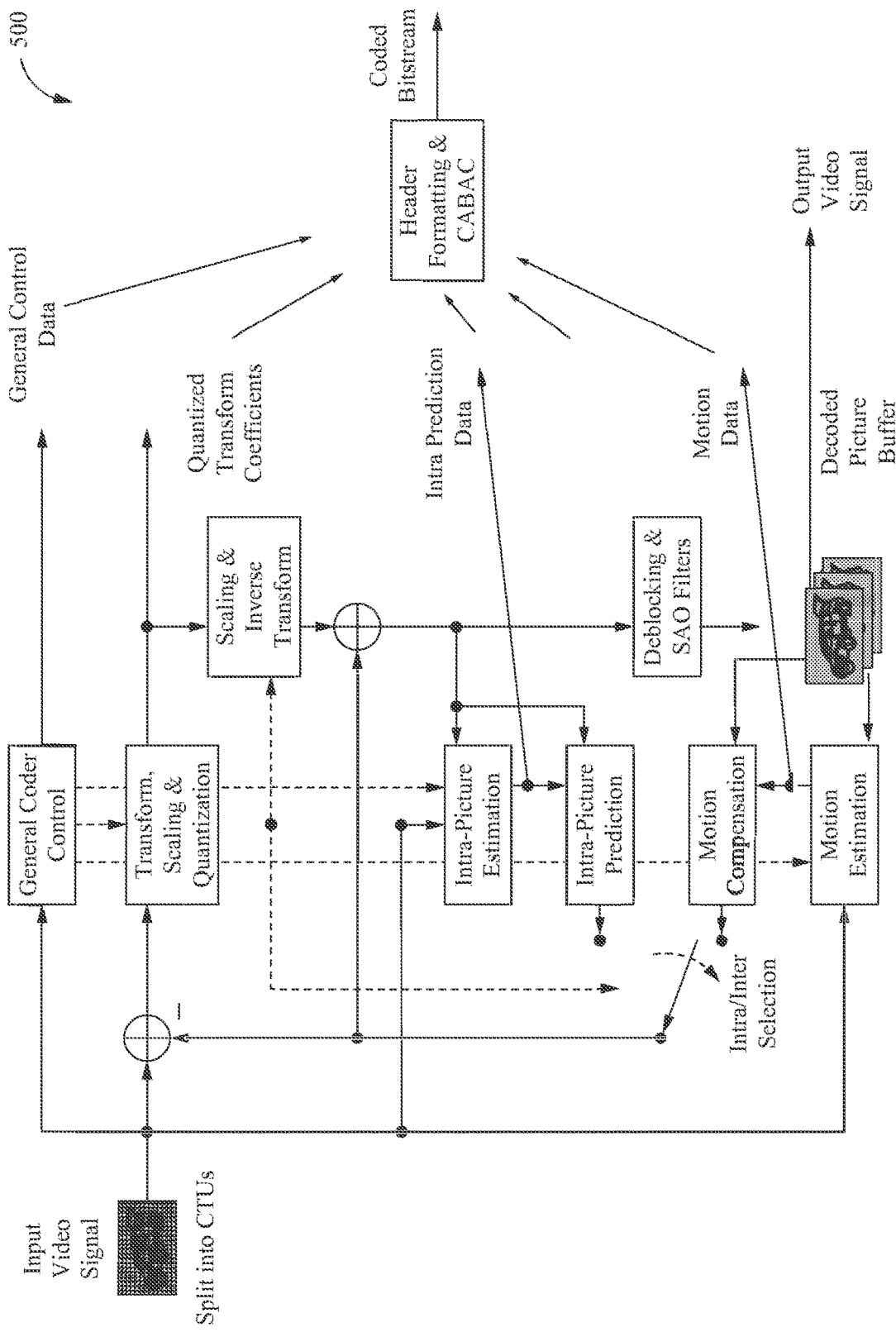
FIG. 5 illustrates a general diagram of an HEVC encoder according to some embodiments.

FIG. 5 illustrates a general diagram of an HEVC encoder according to some embodiments. The encoder 500 includes a general coder control component, a transform scaling and quantization component, a scaling and inverse transform component, an intra-picture estimation component, an intra-picture prediction component, a deblocking and SAO filters component, a motion compensation component, a motion estimation component, and a header formatting and CABAC component. An input video signal is received by the encoder 500 and is split into Coding Tree Units (CTUs). The HEVC encoder components process the video data and generate a coded bitstream. The encoder 500 implements complexity reduction of significant map coding.

Figure 6:
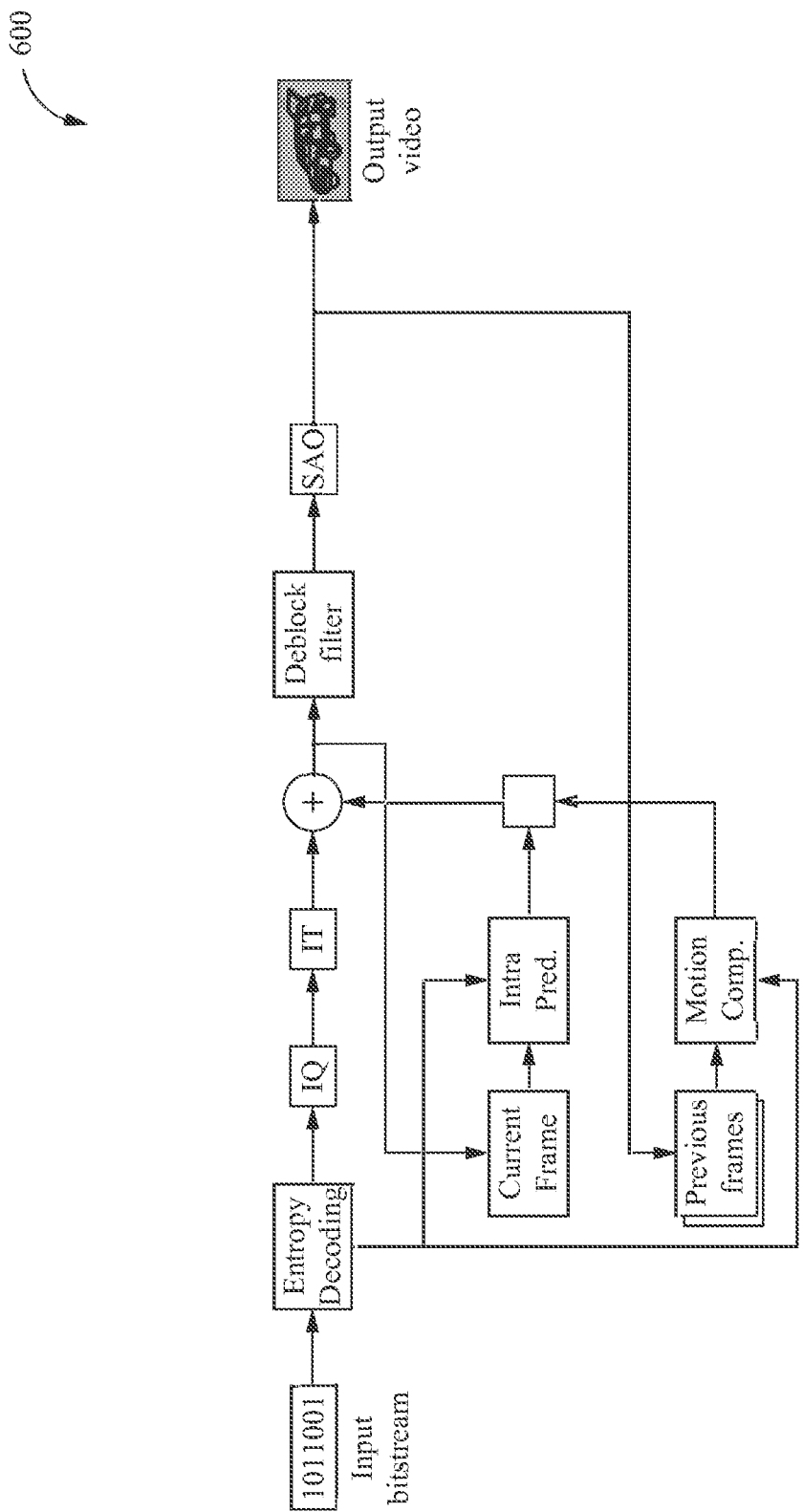
FIG. 6 illustrates a general diagram of an HEVC decoder according to some embodiments.

FIG. 6 illustrates a general diagram of an HEVC decoder according to some embodiments. The decoder 600 includes an entropy decoding component, an inverse quantization component, an inverse transform component, a current frame component, an intra prediction component, a previous frames component, a motion compensation component, a deblocking filter, and an SAO component. An input bitstream (e.g., a coded video) is received by the decoder 600, and a decoded bitstream is generated for display.

To utilize the reduced complexity significance map coding method, a device such as a digital camera is able to be used to acquire a video. The reduced complexity significance map coding method is automatically used for performing video processing. The reduced complexity significance map coding method is able to be implemented automatically without user involvement.

In operation, the reduced complexity map coding method reduces the complexity of coding a significant_coeff_flag in video coding such as High Efficiency Video Coding (HEVC) by using the same mapping to select luma and chroma contexts. As a result, a 15 element lookup table and multiple branches are able to be removed to select the context index, and WD text is also simplified.

Some Embodiments of Complexity Reduction of Significance Map Coding

1. A method of reducing complexity in coding of non-zero 4×4 significance map programmed in a device comprising:
 a. scanning quantized transform coefficients;
 b. determining a position of a last non-zero quantized coefficient; and
 c. generating a significance map from the quantized transform coefficients, wherein the significance of the quantized transform coefficients before the last non-zero quantized coefficient has a same number of contexts and a same mapping for luma and chroma to determine context index increment.

2. The method of clause 1 wherein the context increment mapping comprises a single 15 element lookup table.

3. The method of clause 1 further comprising coding video content without determining a context offset based on a luma/chroma decision of at least one of 8×8, 16×16, and 32×32 significance map.

4. The method of clause 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, a portable music player, a tablet computer, a video player, a DVD writer/player, a high definition video writer/player, a television and a home entertainment system.

5. An encoder comprising:
 a. a scanning module programmed in hardware configured for scanning quantized transform coefficients;
 b. a first generating module programmed in hardware configured for generating a position of a last non-zero quantized transform coefficient; and
 c. a second generating module programmed in hardware configured for generating a significance map from the quantized transform coefficients, wherein the significance of the quantized transform coefficient before the last non-zero quantized coefficient has a same number of contexts and a same mapping for luma and chroma to determine context index increment.

6. The encoder of clause 5 wherein the context increment mapping comprises a single 15 element lookup table.

7. The encoder of clause 5 further comprising a coding module programmed in hardware for coding video content without determining a context offset based on a luma/chroma decision of at least one of 8×8, 16×16, and 32×32 significance map.

8. The encoder of clause 5 wherein the encoder is contained within a device selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, a portable music player, a tablet computer, a video player, a DVD writer/player, a high definition video writer/player, a television and a home entertainment system.

9. An apparatus comprising:
 a. a non-transitory memory for storing an application, the application for generating a significance map from quantized transform coefficients, wherein a significance of a quantized transform coefficient before a last non-zero quantized coefficient has a same number of contexts and a same mapping for luma and chroma to determine context index increment; and b. a processing component coupled to the memory, the processing component configured for processing the application.

10. The apparatus of clause 9 wherein the application is further for scanning the quantized transform coefficients.

11. The apparatus of clause 9 wherein the context increment mapping comprises a single 15 element lookup table.

12. The apparatus of clause 9 wherein the application is further for coding video content without determining a context offset based on a luma/chroma decision of at least one of 8×8, 16×16, and 32×32 significance map.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

The invention claimed is:

1. An encoding device, comprising:
circuitry configured to:
   scan a plurality of quantized transform coefficients that includes at least one non-zero quantized transform coefficient;
   determine a position of a last non-zero quantized coefficient based on the scan;
   assign each context of significant_coeff_flag based on a level of a corresponding quantized transform coefficient of the plurality of quantized transform coefficients, wherein the level of the corresponding quantized transform coefficient is non-zero;
   encode the position of the last non-zero quantized coefficient, and a significance of the plurality of quantized transform coefficients before the last non-zero quantized coefficient, wherein the significance of the plurality of quantized transform coefficients is encoded with a same number of contexts and a same context increment mapping for luma components of the plurality of quantized transform coefficients and chroma components of the plurality of quantized transform coefficients, wherein
      the same context increment mapping comprises a single 15-element lookup table such that a grouping of 4×4 luma contexts are reusable for grouping of 4×4 chroma contexts,
      the plurality of quantized transform coefficients is before the last non-zero quantized coefficient in a scanning order, and
      a count of contexts of the luma components of the plurality of quantized transform coefficients is equal to a count of contexts of the chroma components of the plurality of quantized transform coefficients; and
   encode, by a significance map encoding process, the luma components of the plurality of quantized transform coefficients of a 4×4 block and the chroma components of the plurality of quantized transform coefficients of the 4×4 block, based on following table:

| Specification of ctxIdxMap4 × 4[i] | | | | | | | | | | | | | | | |
|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 |
| ctxIdxMap4 × 4[i] | 0 | 1 | 4 | 5 | 2 | 3 | 4 | 5 | 6 | 6 | 8 | 8 | 7 | 7 | 8. | wherein
   the table is a mapping table between each index i for the plurality of quantized transform coefficients of the 4×4 block and each context index for the plurality of quantized transform coefficients of the 4×4 block,
   the grouping of the 4×4 chroma contexts for the same context increment mapping as the grouping of the 4×4 luma contexts comprises:

| Specification of ctxIdxMap4 × 4[i] | | | | | | | | | | | | | | | |
|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 |
| ctxIdxMap4 × 4[i] | 0 | 1 | 2 | 4 | 1b | 1a | 2 | 4 | 3 | 3 | 5 | 5 | 4a | 4a | 5, | and
   the grouping of the 4×4 chroma contexts includes contexts 1a, 1b, and 4a as additional contexts.

2. The encoding device according to claim 1, wherein the each context index for the plurality of quantized transform coefficients of the 4×4 block corresponds to a variable sigCtx.

3. The encoding device according to claim 2, wherein the circuitry is further configured to derive the variable sigCtx, as a current coefficient scan position (xC, yC), based on ctxIdxMap4×4 [i] as specified in the table.

4. The encoding device according to claim 1, wherein
   formation of the 4×4 block is based on a block partitioning process, and
   the block partitioning process comprises recursive split of a coding block into transform blocks.

5. An encoding method, comprising:
in an encoding device:
   scanning a plurality of quantized transform coefficients that includes at least one non-zero quantized transform coefficient;
   determining a position of a last non-zero quantized coefficient based on the scan;
   assigning each context of significant_coeff_flag based on a level of a corresponding quantized transform coefficient of the plurality of quantized transform coefficients, wherein the level of the corresponding quantized transform coefficient is non-zero;

encoding the position of the last non-zero quantized coefficient, and a significance of the plurality of quantized transform coefficients before the last non-zero quantized coefficient, wherein the significance of the plurality of quantized transform coefficients is encoded with a same number of contexts and a same context increment mapping for luma components of the plurality of quantized transform coefficients and chroma components of the plurality of quantized transform coefficients, wherein the same context increment mapping comprises a single 15-element lookup table such that a grouping of 4×4 luma contexts are reusable for grouping of 4×4 chroma contexts, the plurality of quantized transform coefficients is before the last non-zero quantized coefficient in a scanning order, and a count of contexts of the luma components of the plurality of quantized transform coefficients is equal to a count of contexts of the chroma components of the plurality of quantized transform coefficients; and significance map encoding the luma components of the plurality of quantized transform coefficients of a 4×4 block and the chroma components of the plurality of quantized transform coefficients of the 4×4 block, based on following table:

| | Specification of ctxIdxMap4 × 4[i] | | | | | | | | | | | | | | |
|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 |
| ctxIdxMap4 × 4[i] | 0 | 1 | 4 | 5 | 2 | 3 | 4 | 5 | 6 | 6 | 8 | 8 | 7 | 7 | 8 | wherein
the table is a mapping table between each index i for the plurality of quantized transform coefficients of the 4×4 block and each context index for the plurality of quantized transform coefficients of the 4×4 block,
the grouping of the 4×4 chroma contexts for the same context increment mapping as the grouping of the 4×4 luma contexts comprises:

| | Specification of ctxIdxMap4 × 4[i] | | | | | | | | | | | | | | |
|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 |
| ctxIdxMap4 × 4[i] | 0 | 1 | 2 | 4 | 1b | 1a | 2 | 4 | 3 | 3 | 5 | 5 | 4a | 4a | 5, | and
the grouping of the 4×4 chroma contexts includes contexts 1a, 1b, and 4a as additional contexts.

6. The encoding method of claim 5, wherein the each context index for the plurality of quantized transform coefficients of the 4×4 block corresponds to a variable sigCtx.

7. The encoding method of claim 6, further comprising deriving the variable sigCtx, as a current coefficient scan position (xC, yC), based on ctxIdxMap4×4 [i] as specified in the table.

8. The encoding method of claim 5, wherein
formation of the 4×4 block is based on a block partitioning process, and
the block partitioning process comprises recursively splitting a coding block into transform blocks.

* * * * *